(12) United States Patent
Aitamurto et al.

(10) Patent No.: US 11,043,340 B2
(45) Date of Patent: Jun. 22, 2021

(54) INSPECTION STATION

(71) Applicant: KONE Corporation, Helsinki (FI)

(72) Inventors: Juha-Matti Aitamurto, Helsinki (FI); Mikko Vaskela, Helsinki (FI); Jukka Korpela, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 17/019,844

(22) Filed: Sep. 14, 2020

(65) Prior Publication Data

US 2021/0125801 A1    Apr. 29, 2021

(30) Foreign Application Priority Data

Oct. 28, 2019 (EP) .................................. 19205605

(51) Int. Cl.
*H01H 13/70* (2006.01)
*H01H 13/702* (2006.01)

(52) U.S. Cl.
CPC ..... *H01H 13/702* (2013.01); *H01H 2215/008* (2013.01); *H01H 2221/044* (2013.01); *H01H 2223/002* (2013.01)

(58) Field of Classification Search
CPC ........... H01H 13/702; H01H 2215/008; H01H 2221/044
USPC ........................................................ 200/512
See application file for complete search history.

(56) References Cited

U.S. PATENT DOCUMENTS

| 6,087,600 | A | 7/2000 | Kaufmann et al. |
| 7,050,292 | B2 * | 5/2006 | Shimura ............. B60R 16/0239 |
| | | | 200/302.2 |
| 2005/0109602 | A1 * | 5/2005 | Parkinson ............. H01H 13/86 |
| | | | 200/511 |
| 2011/0214976 | A1 | 9/2011 | Bloch |
| 2012/0111709 | A1 * | 5/2012 | Senzaki ............... H01H 9/0235 |
| | | | 200/5 A |

FOREIGN PATENT DOCUMENTS

| CN | 101298305 A | 11/2008 |
| CN | 205442281 U | 8/2016 |
| EP | 3 313 767 A1 | 5/2018 |
| EP | 3313767 | * 5/2018 ............. B66B 19/00 |

OTHER PUBLICATIONS

Corrected European Search Report, issued in Priority Application No. 19205605.9, dated Apr. 16, 2020.

* cited by examiner

*Primary Examiner* — Edwin A. Leon
*Assistant Examiner* — Iman Malakooti
(74) *Attorney, Agent, or Firm* — Birch, Stewart, Kolasch & Birch, LLP

(57) ABSTRACT

An inspection station is capable of being used under harsh conditions. The inspection station includes switch elements to which the inspection station is responsive for generating a predetermined control signal in response to actuation of a switch element. A fluid tight sealing element isolates an interior of the inspection station from an outside of the inspection station, the sealing element including one or more flexible button areas at the locations of the switch elements to provide access from the outside of the inspection station to actuate the switch elements located in the interior of the sealing element.

20 Claims, 2 Drawing Sheets

INSPECTION STATION

BACKGROUND OF THE INVENTION

Field of the Invention

This invention relates to an inspection station. In the following the inspection station will be explained by way of example with reference to elevator systems. However, the inspection station can be utilized also for other purposes.

Description of Prior Art

Inspection stations are utilized for driving manually devices, such as elevator systems, in special situations when normal operation is not activated.

A challenge with inspection stations is that the conditions they are used in may be very harsh. One alternative is that such a need for manual drive occurs during firefighting. At that stage water may be sprayed in the surroundings of and even onto the inspection station, however, use of the inspection station is still required.

In order to ensure that the inspection station remains in a working condition also during such conditions, additional attention needs to be paid to the tightness of the inspection station. This is a challenge, as components specifically designed to operate under such conditions are usually very expensive, and an inspection station requires a plurality of components to work efficiently.

SUMMARY OF THE INVENTION

An object of the present invention is to solve the above mentioned drawback and to provide an inspection station which can be produced cost efficiently and remain operational also under harsh conditions. This object is achieved with an inspection station according to independent claims 1 and 15.

Use of a fluid tight sealing element with flexible button areas isolating an interior of the inspection station from an outside of the inspection station makes it possible to simply and reliably provide access to switch elements located in the interior of the sealing element and to utilize the inspection station under harsh conditions.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
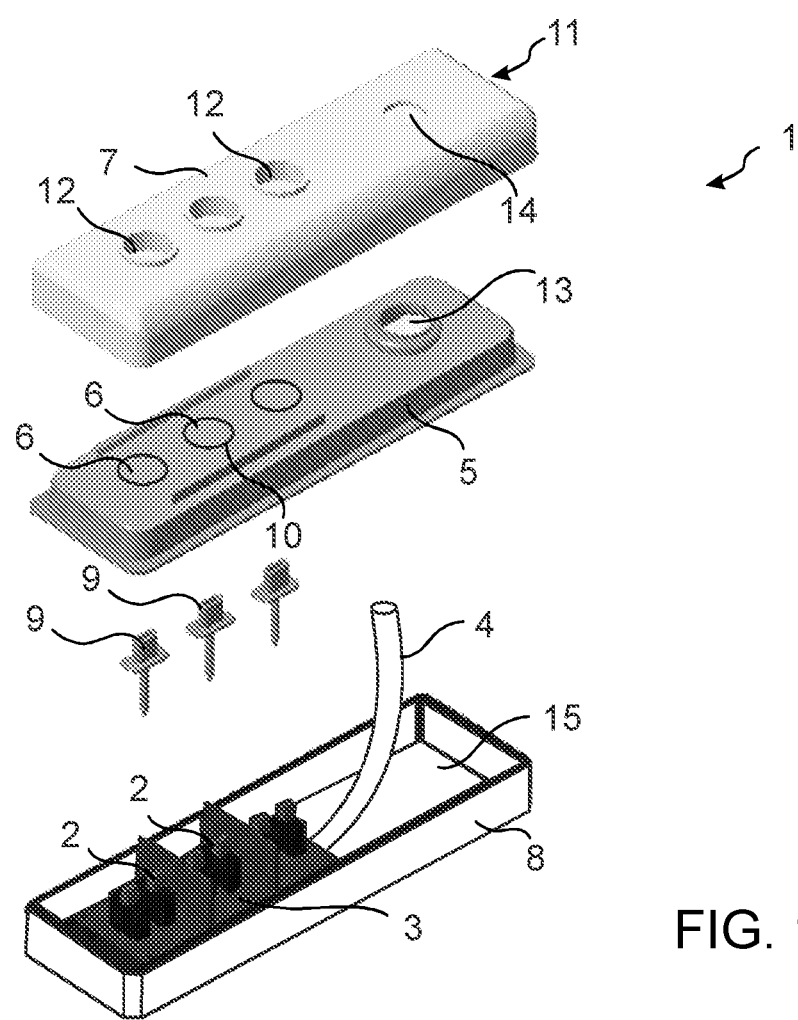
FIG. 1 illustrates a first embodiment of an inspection station.

FIG. 1 illustrates a first embodiment of an inspection station 1. In FIG. 1 parts of the inspection station are illustrated prior to attachment to each other.

The inspection station 1 comprises switch elements 2, which by way of example are attached to a printed circuit board 3 in the illustrated example. A cable 4 is in this example used for connecting the inspection station 1 to an external device, such as to an elevator system, for instance. Depending on the implementation, the cable 4 may be supply control signals and electrical power.

The inspection station 1 is responsive to actuation of the switch elements 2. Once a user actuates a switch element by pressing, a predetermined control signal is generated by the inspection station 1 and passed on via the cable 4. The control signal may be generated in different ways depending on the implementation. One alternative is that the actuated switch element interconnects two different conductors of the cable 4, such that this can be detected as a control signal in the other end of the cable, such as at an elevator system. Alternatively, the inspection station 1 can be provided with additional electric components, such that different control signals are generated by the inspection station due to actuation of the same button, in which case the generated control signal may be differently generated based on the operation mode of the inspection station at that particular moment.

In order to ensure that the inspection station remains operable under harsh conditions while water may be sprayed on it, for instance, a fluid tight sealing element 5 isolates an interior 15 of the inspection station 1 from an outside 7 of the inspection station. In the illustrated example the switch elements 2 of the inspection station are contained in a box 8 having fluid tight side walls and bottom walls. When the sealing element 5 is attached as a lid to this box 8, the interior 15 of the inspection station is entirely fluid tight.

The sealing element 5 is provided with one or more flexible button areas 6 at the locations of the switch elements 2 such that a user of the inspection station 1 is provided with access to the switch elements 2. In the illustrated example one single sealing element 5 is utilized to isolate the entire interior 15 of the inspection station. In this way each separate switch element 2 is protected by the same large sealing element 5 such that use of more expensive switch elements where each switch element is fluid protected by a separate sealing structure can be avoided. This sealing element 5 may be manufactured entirely of silicon or of a material comprising silicon. In this way the entire sealing element 2 is implemented as a flexible fluid (such as water) tight gasket element. Alternatively, the sealing element may be manufactured of a combination of different materials, such as of a more stiff plastic with flexible silicon material provided only at the one or more button areas 6. In any case, once a button area 6 is pressed, the material of the sealing element changes shape such that the sealing element 5 comes into contact with a corresponding switch element 2, or alternatively, with a corresponding hard pusher 9 contacting the switch element. In the illustrated example hard pushers 9 are by way of example provided in a space between the sealing element 1 and the switch elements 2, though such hard pushers are not needed in all embodiments.

In case the sealing element 5 forms an outermost lid of the inspection station, markings 10 such as circles (with text or symbols), can be provided in the button area or button areas 6 to indicate the locations of the switch elements 2. However, in the example illustrated in FIG. 1, an additional hard cover 11 is provided to cover the sealing element 5 from the outside 7 of the inspection station. In that case openings 12 are provided in the cover 11 at the locations of the switch elements 2, such that the use may press the button areas 6 of the sealing element 5 through these openings 12 to actuate the switch elements 2.

In FIG. 1 the sealing element 5 and the cover 11 have each an additional opening 13 and 14. The cable 4 can be led out form the inspection station via these openings by utilizing an appropriate fluid tight cable lead-through part. Alternatively, the opening 13 of in sealing element 1 can be dimensioned to tightly match the dimension of the cable 4, such that use of an additional lead-through part can be avoided.

In case the illustrated inspection station 1 is used with an elevator system, the inspection station can be located in a pit inspection station of an elevator, on top of an elevator car, in a machine room of the elevator or in an elevator shaft, for instance. From this location the inspection station 1 communicates with the elevator system via the cable 4, for instance. In that case one of the manual buttons or switch elements 2 may be used for triggering generation of a predetermined control signal that initiates a manual inspection drive of the elevator car with a low speed (such as 0.3 m/s), for instance. One alternative is that the elevator car starts moving when a specific switch element 2 is actuated and continues moving until actuation of this switch element ends. Before this, the inspection drive may need to be enabled by utilizing a switch element 2 of the inspection station 1 assigned to be a mode selection button. Subsequently, once inspection drive is no longer needed, a predetermined switch element 2 may be utilized to enable normal elevator drive operation mode.

Figure 2:
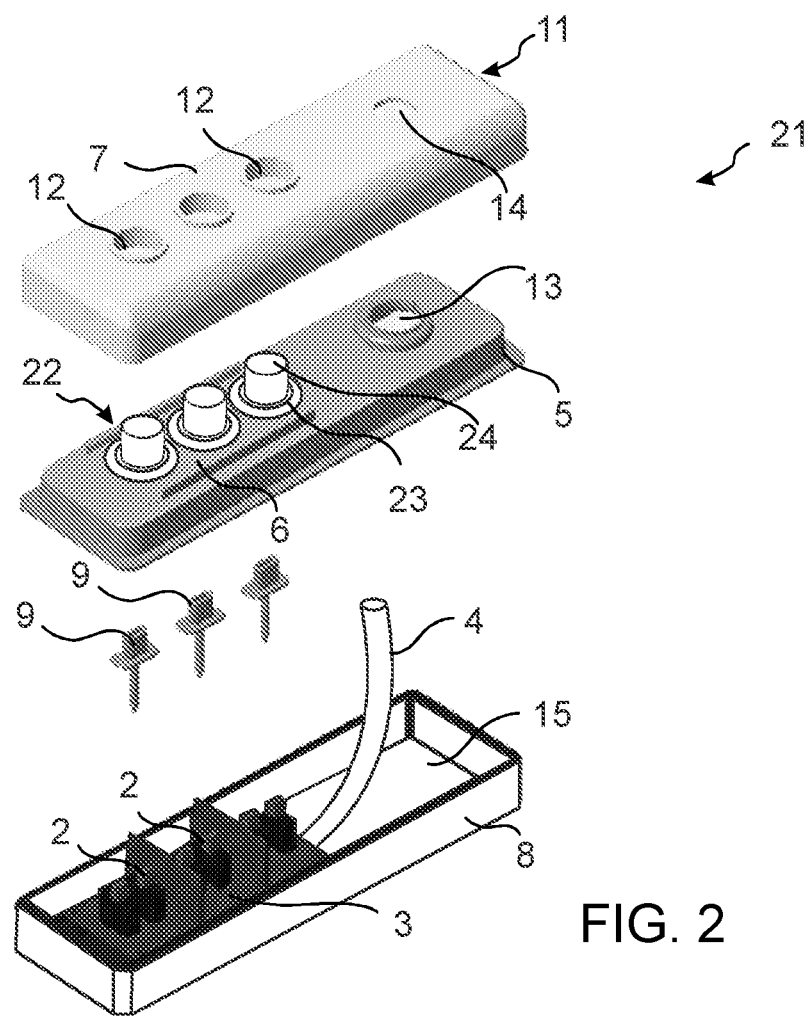
FIG. 2 illustrates a second embodiment of an inspection station.

FIG. 2 illustrates a second embodiment of an inspection station. The inspection station 21 illustrated in FIG. 2 is very similar to the one explained in connection with FIG. 1. Therefore, the embodiment of FIG. 2 is in the following mainly explained by referring to the differences between these embodiments.

In FIG. 2, button elements 22 are arranged in a space between the sealing element 5 and the hard cover 11. The button elements 22 have a first end 23 contacting the button area 6 or button areas, and a second end 24 protruding into the openings 12 of the cover 11, and possibly further out past the outer surface of the cover. In any case, this makes it possible for the user to actuate a selected switch element 2 by pressing the second end 24 of the corresponding button element 22.

Figure 3:
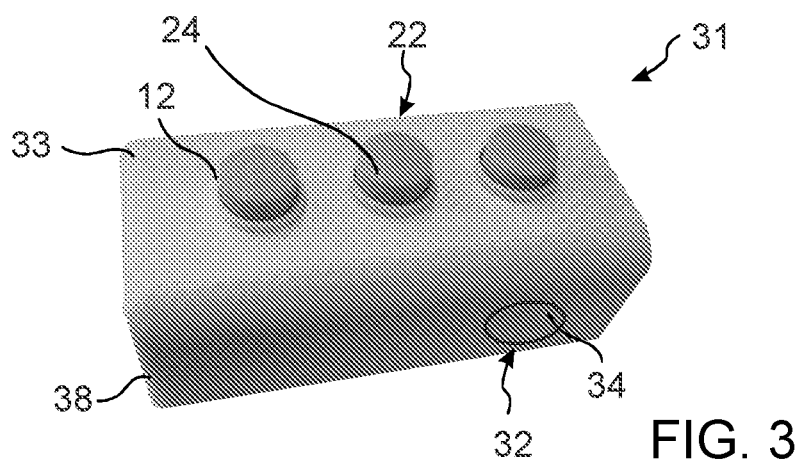
FIG. 3 illustrates a third embodiment of an inspection station.

FIG. 3 illustrates a third embodiment of an inspection station. The inspection station 31 illustrated in FIG. 3 is very similar to the one explained in connection with FIG. 2. Therefore, the embodiment of FIG. 3 is in the following mainly explained by referring to the differences between these embodiments.

In FIG. 3 the inspection station 31 is illustrated with the cover 33 and box 38 attached to each other. Consequently, the second ends 24 of the button elements 22 extend out through the openings 12 in the cover. For simplicity, the cable illustrated in the previous figures is not shown in FIG. 3. This cable may pass through an opening in the cover 33 similarly as in the previous embodiments, or alternatively, an opening may be arranged in the box 38.

In FIG. 3 the inspection station 31 is additionally provided with a buzzer 32. In the illustrated example, this buzzer is arranged in a sidewall of the box 38, however, alternatively it can be arranged in the cover 33.

In an inspection station for an elevator system it is preferable to use a buzzer with an adjustable sound level in the range of 35 dB(A) and 65 dB(A). Such a buzzer can be used to indicate by sound signals operational states of the elevator system, pit inspection reset need and success of reset, or connection problems in the cable between the inspection station and the elevator system, for instance.

In order to ensure fluid tightness, the buzzer 32 is provided with a fluid tight membrane 34 of plastic, for instance. An advantage with such a buzzer is that no separate sealing is needed for the membrane, as the membrane itself can prevent fluid from entering the interior of the inspection station via the membrane, due to which it is sufficient to provide a seal only along to outer edges of the buzzer. Such a buzzer can be utilized also in the inspection stations described in connection with FIGS. 1 and 2.

As an alternative, it is also possible to locate the buzzer 32 within the inspection station so that it is not visible from the outside. In that case the buzzer may be located in the interior 15 of the inspection station, where the sealing element 5 isolates it from the outside of the inspection element. In that case it is not necessary for the membrane to be fluid tight.

According to an embodiment, a bidirectional audio communication channel may be established between the inspection station and elevator control and/or service center located remotely. In that case the inspection station may include or may be connected with a microphone to send an audio signal to the communication channel, and the buzzer 32 may be utilized to receive an audio signal from the communication channel. This can mean that a simple and low-cost intercom system between inspection station and elevator control/service center may be achieved.

It is to be understood that the above description and the accompanying figures are only intended to illustrate the present invention. It will be obvious to a person skilled in the art that the invention can be varied and modified without departing from the scope of the invention.

The invention claimed is:

1. An inspection station, comprising:
a base having an open top surface;
a plurality of switch elements disposed within the base, wherein the inspection station is configured to generate a control signal in response to actuation of a respective one of the plurality of switch elements;
a cable configured to supply the generated control signal to an elevator system;
a cover; and
a fluid tight sealing element contacting the cover and the base and disposed between the cover and the base, the fluid tight sealing element configured to seal the inspection station,
wherein the fluid tight sealing element comprises:
a plurality of button areas provided at locations corresponding to the plurality of switch elements, the plurality of button areas being configured to elastically deform in response to a pressing of the plurality of switch elements; and
an opening having substantially a same size as the cable, wherein the cable passes through the opening.

2. The inspection station according to claim 1, wherein the fluid tight sealing element is an elastic gasket covering an entirety of the open top surface of the base.

3. The inspection station according to claim 1, wherein the flexible button areas are provided with markings indicating the location of the plurality of switch elements.

4. The inspection station according to claim 1, wherein the flexible sealing element is made of silicon or comprises silicon.

5. The inspection station according to claim 1, wherein the cover covers the flexible sealing element and is provided with openings,
wherein the plurality of switch elements extend through the openings of the cover to provide access to actuate the plurality of switch elements.

6. The inspection station according to claim 5, wherein plurality of button elements are arranged between the sealing element and the cover, the plurality of button elements having a first end contacting the one or more button areas of the sealing element, and a second end protruding into the openings of the cover.

7. The inspection station according to claim 1, further comprising a printed circuit board disposed on the base and the plurality of switch elements are disposed on the printed circuit board.

8. The inspection station according to claim 1, wherein further comprising pushers disposed between the sealing element and the plurality of switch elements to mechanically couple the plurality of button areas to the plurality of switch elements.

9. The inspection station according to claim 1, wherein the predetermined control signal is an inspection drive command signal for the elevator system.

10. The inspection station according to claim 9, further comprising a buzzer configured to generate sound signals indicating predetermined operational states of the elevator system.

11. The inspection station according to claim 10, wherein the buzzer comprises a fluid tight membrane sealing the buzzer to the sealing element.

12. The inspection station according to claim 9, wherein the sound level of the buzzer is adjustable between 35 dB(A) and 65 dB(A).

13. An elevator system comprising an elevator control and an inspection station according to claim 1, wherein the inspection station is communicatively connected to an elevator control via the cable.

14. The elevator system according to claim 13, further comprising a buzzer,
wherein elevator control controls the buzzer to generate sound signals.

15. The inspection station according to claim 2, wherein the flexible button areas are provided with markings indicating the location of the plurality of switch elements.

16. The inspection station according to claim 2, wherein the flexible sealing element is made of silicon or comprises silicon.

17. The inspection station according to claim 3, wherein the flexible sealing element is made of silicon or comprises silicon.

18. The inspection station according to claim 2, wherein the cover covers and is provided with openings, and
wherein the plurality of switch elements extend through the openings of the cover to provide access to actuate the plurality of switch elements.

19. The inspection station according to claim 3, wherein the cover covers the sealing element and is provided with openings, and
wherein the plurality of switch elements extend through the openings of the cover to provide access to actuate the plurality of switch elements.

20. The inspection station according to claim 7, wherein the cable is connected to the printed circuit hoard.

* * * * *